United States Patent
Nagano et al.

(10) Patent No.: US 9,225,138 B2
(45) Date of Patent: Dec. 29, 2015

(54) LASER LIGHT SOURCE

(71) Applicant: Sumitomo Electric Industries, Ltd., Osaka (JP)

(72) Inventors: Shigehiro Nagano, Yokohama (JP); Motoki Kakui, Yokohama (JP); Hiroshi Kohda, Yokohama (JP); Shinobu Tamaoki, Yokohama (JP); Yasuomi Kaneuchi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/423,898

(22) PCT Filed: Aug. 23, 2013

(86) PCT No.: PCT/JP2013/072592
§ 371 (c)(1),
(2) Date: Feb. 25, 2015

(87) PCT Pub. No.: WO2014/034567
PCT Pub. Date: Mar. 6, 2014

(65) Prior Publication Data
US 2015/0229094 A1  Aug. 13, 2015

(30) Foreign Application Priority Data
Aug. 31, 2012 (JP) .................. 2012-192107

(51) Int. Cl.
*H01S 3/00* (2006.01)
*G02F 1/09* (2006.01)
(Continued)

(52) U.S. Cl.
CPC .............. *H01S 3/0064* (2013.01); *G02B 27/28* (2013.01); *G02F 1/009* (2013.01); *G02F 1/0063* (2013.01);
(Continued)

(58) Field of Classification Search
CPC ....... H01S 3/0064; H01S 3/0092; H01S 3/13; H01S 3/02; H01S 3/067; H01S 3/06758; G02F 1/093; G02F 1/3501; G02F 1/3551; G02F 1/0063; G02F 1/009; G02F 1/0136; G02F 2001/3503; G02F 2001/3509; G02B 27/28
USPC ................................ 359/341.1, 484.03; 372/6
See application file for complete search history.

(56) References Cited

U.S. PATENT DOCUMENTS 5,803,607 A * 9/1998 Jones ..................... G01K 13/02
374/121
5,835,458 A * 11/1998 Bischel ................ G11B 7/1208
369/112.27

(Continued)

FOREIGN PATENT DOCUMENTS

JP 04-347823 A 12/1992
JP 11-109289 A 4/1999
(Continued)

OTHER PUBLICATIONS

International Preliminary Report on Patentability in PCT International Application No. PCT/JP2013/072592, dated Mar. 12, 2015.
(Continued)

*Primary Examiner* — Frank Font
(74) *Attorney, Agent, or Firm* — Venable LLP; Michael A. Sartori

(57) ABSTRACT

The present invention relates to a laser light source capable of suppressing variation in propagation state of randomly-polarized laser light. In the laser light source, an isolator including a Faraday rotation crystal having a positive thermooptic constant, and a nonlinear optical crystal having a negative thermooptic constant are arranged in order along a traveling direction of laser light. The nonlinear optical crystal is arranged in a state off normal incidence of incident light so that a propagation axis of light propagating in the crystal is parallel to an optic axis of the crystal.

8 Claims, 19 Drawing Sheets

(51) Int. Cl.
- *G02F 1/35* (2006.01)
- *G02F 1/355* (2006.01)
- *G02B 27/28* (2006.01)
- *H01S 3/13* (2006.01)
- *H01S 3/02* (2006.01)
- *G02F 1/00* (2006.01)
- *G02F 1/01* (2006.01)
- *H01S 3/067* (2006.01)

(52) U.S. Cl.
CPC .............. *G02F 1/0136* (2013.01); *G02F 1/093* (2013.01); *G02F 1/3501* (2013.01); *G02F 1/3551* (2013.01); *H01S 3/0092* (2013.01); *H01S 3/02* (2013.01); *H01S 3/067* (2013.01); *H01S 3/13* (2013.01); *G02F 2001/3503* (2013.01); *G02F 2001/3509* (2013.01); *H01S 3/06758* (2013.01)

(56) References Cited

U.S. PATENT DOCUMENTS

| | | | |
|---|---|---|---|
| 5,946,130 A * | 8/1999 | Rice | G02B 6/4249 359/346 |
| 6,587,497 B1 * | 7/2003 | Libby | H01S 3/08 372/94 |
| 2005/0089263 A1 * | 4/2005 | Wessel | G02F 1/0955 385/14 |
| 2011/0080663 A1 * | 4/2011 | Arain | G02B 7/028 359/820 |

FOREIGN PATENT DOCUMENTS

| | | |
|---|---|---|
| WO | WO-2007026510 A1 | 3/2007 |
| WO | WO-2012037177 A2 | 3/2012 |

OTHER PUBLICATIONS

Ilya Snetkov et al., "Compensation of thermally induced depolarization in Faraday isolators for high average power lasers," Optics Express, 2011, vol. 19, No. 7, pp. 6366-6376.

Efim Khazanov et al., "Compensation of thermally induced modal distortions in Faraday isolators," IEEE Journal of Quantum Electronics, 2004, vol. 40, No. 10, pp. 1500-1510.

International Search Report issued in PCT Application No. PCT/JP2013/072592 dated Nov. 26, 2013.

* cited by examiner

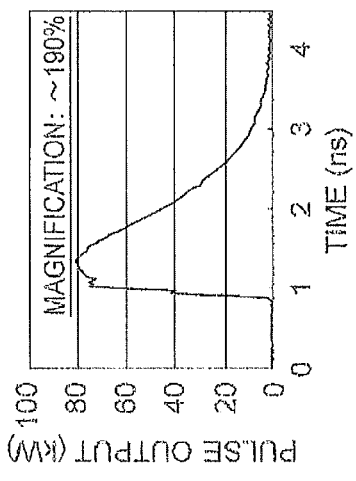
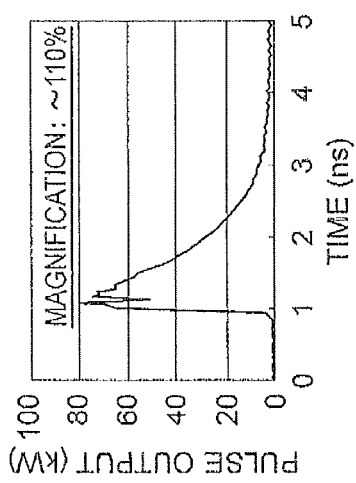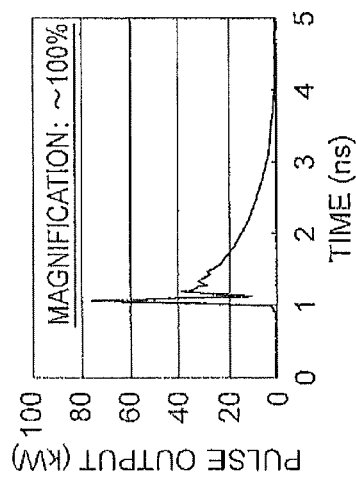

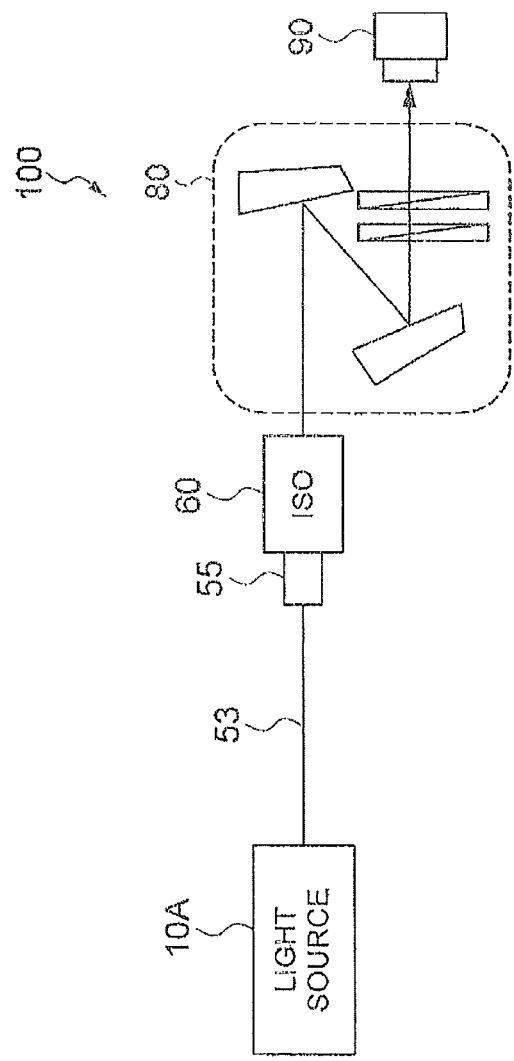

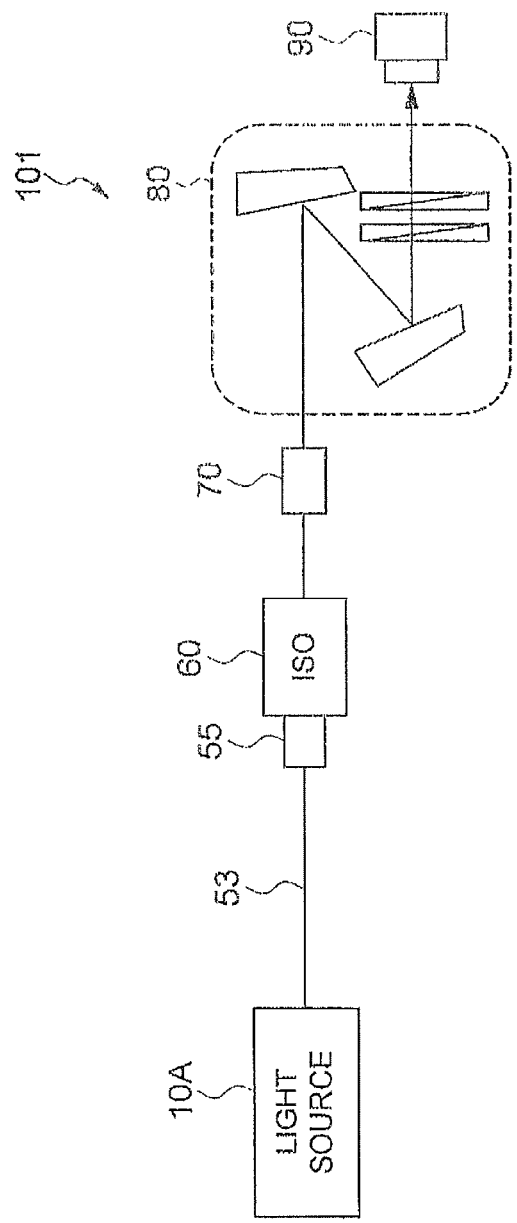

LASER LIGHT SOURCE

TECHNICAL FIELD

The present invention relates to a laser light source.

BACKGROUND ART

A laser light source equipped with an ISO (Isolator) as an antireflection element is known as a laser light source used for laser processing and others. In such a laser light source, a Faraday rotation crystal to be used for forming the ISO is, for example, a TGG ($Tb_3Ga_5O_{12}$) crystal or a TSAG ($Tb_3(ScAl)_5O_{12}$) crystal having a positive thermooptic constant. Methods for controlling variation of beam propagation due to the thermal lens effect of these Faraday rotation crystals are disclosed, for example, in Patent Literatures 1-2 and Non Patent Literatures 1-2. Specifically, Patent Literature 1 and Non Patent Literatures 1-2 disclose the method of locating a DKDP (Deuterated Potassium Dihydrogen Phosphate) crystal having a negative thermooptic constant, or the like on the optical path, thereby compensating for the thermal lens effect of the TGG crystal or the TSAG crystal. Patent Literature 2 discloses a Faraday rotator capable of reducing the thermal lens effect, which can be applied to the ISO.

CITATION LIST

Patent Literatures

Patent Literature 1: U.S. Pat. Application Publication No. 2011/0080663
Patent Literature 2: Japanese Patent Application Laid-open Publication No. 2005-283635

Non Patent Literatures

Non Patent Literature 1: CLEO2006, JThC35
Non Patent Literature 2: LIGO Laboratory/LIGO Scientific collaboration, LIGO-T060267-00-D (Aug. 20, 2007)

SUMMARY OF INVENTION

Technical Problem

The Inventors conducted research on the conventional laser light sources and found the problem as described below. Namely, the following problem can arise in controlling the variation of beam propagation with the use of the DKDP crystal. For example, the DKDP crystal has the feature of producing polarization dependence except for light incident normally to its optic axis. For this reason, in order to let randomly-polarized laser light (which is laser light with the polarization direction varying with time) pass without production of the polarization dependence, it is necessary to make the propagation axis of the laser light propagating in the crystal coincident with the optic axis of the DKDP crystal. On the other hand, if the DKDP crystal is arranged normally to the direction of incidence of the laser light, optical feedback produced on the entrance end face of the DKDP crystal could damage the light source element.

The present invention has been accomplished in order to solve the problem as describe above, and it is an object of the present invention to provide a laser light source having a structure for effectively suppressing the variation or variation expansion of the propagation state of the randomly-polarized laser light. Parameters to define the propagation state of the laser light include the beam diameter, the beam shape (cross-sectional shape), the position of a beam waist after collimated, and so on.

Solution to Problem

In order to solve the above problem, a laser light source according to the present invention, as a first aspect, comprises: a seed light source, a fiber laser, a collimator lens, an isolator comprising a Faraday rotation crystal having a positive thermooptic constant, and a nonlinear optical crystal having a negative thermooptic constant. The fiber laser amplifies seed light, e.g., pulsed light or the like, emitted from the seed light source. The collimator lens collimates laser light emitted from the fiber laser. The isolator has an entrance end face for the laser light collimated by the collimator lens to enter and an exit end face for the laser light to exit. In the isolator, the Faraday rotation crystal is arranged between the entrance end face and the exit end face. The nonlinear optical crystal is arranged on an optical path of the laser light propagating between the collimator lens and the isolator or on an optical path of the laser light emitted from the exit end face of the isolator. The nonlinear optical crystal has a first end face (entrance end face) for the laser light to enter and a second end face (exit end face) for the laser light to exit, the second end face being opposed to the first end face. Particularly, in this first aspect, the nonlinear optical crystal is arranged so as to maintain a specific posture. Namely, the nonlinear optical crystal is arranged so that an angle (an angle of incidence) between a first propagation axis of the laser light to be made incident to the first end face of the nonlinear optical crystal (which will be referred to hereinafter as "before-incidence propagation axis) and a normal to the first end face is larger than 0° and less than 90° and so that a second propagation axis of the laser light propagating in the nonlinear optical crystal (which will be referred to hereinafter as "in-crystal propagation axis) is parallel to an optic axis of the nonlinear optical crystal. The propagation axis of the laser light having emerged from the exit end face of the nonlinear optical crystal will be referred to hereinafter as "after-emergence propagation axis."

Since in the laser light source according to the first aspect the angle of the before-incidence propagation axis of the laser light to the entrance end face of the nonlinear optical crystal is larger than 0° and less than 90°, the light quantity of optical feedback to the seed light source or to a pumping light source in the fiber laser, or the like can be reduced or made completely zero. Furthermore, since the posture of the nonlinear optical crystal is set so that the in-crystal propagation axis of the laser light is parallel to the optic axis of the nonlinear optical crystal, the production of polarization dependence can be suppressed even in the case where the randomly-polarized laser light passes in the nonlinear optical crystal (i.e., the birefringence phenomenon does not occur for the laser light propagating in the nonlinear optical crystal).

As a second aspect applicable to the first aspect, the angle between the before-incidence propagation axis of the laser light and the normal to the entrance end face of the nonlinear optical crystal is more preferably not less than 1° and not more than 10°.

As a third aspect applicable to at least either one of the first and second aspects, a thickness of the nonlinear optical crystal along the in-crystal propagation axis of the laser light (the optic axis of the nonlinear optical crystal in a state in which the nonlinear optical crystal is not installed as in the first aspect) is not less than 5 mm and not more than 30 mm. As a fourth aspect applicable to at least any one of the first to second aspects, the laser light source may further comprise a position control mechanism for variably controlling a position of incidence of the laser light on the entrance end face of the nonlinear optical crystal and a length of a side of a cross section of the nonlinear optical crystal, perpendicular to the in-crystal propagation axis of the laser light (the optic axis of the nonlinear optical crystal in a state in which the nonlinear optical crystal is not installed as in the first aspect), is preferably not less than 0.7 mm and not more than 20 mm. Particularly, in this fourth aspect, when axes perpendicular to each other on the cross section of the nonlinear optical crystal are defined as a first reference axis and a second reference axis, a shape of the cross section is preferably a square, a rectangle, a shape in which a plurality of rectangular portions with different thicknesses along the first reference axis are arranged so as to be adjacent along the second reference axis, or a shape in which the thickness along the first reference axis continuously varies along the second reference axis. Specifically, as a fifth aspect applicable to the fourth aspect, the shape in which the plurality of rectangular portions with different thicknesses along the first reference axis are arranged along the second reference axis includes a stepped shape or a comb shape.

As a sixth aspect applicable to at least any one of the first to fifth aspects, at least a part of a peripheral surface of the nonlinear optical crystal is preferably covered by electroconductive silicone. On the other hand, as a seventh aspect applicable to at least any one of the first to fifth aspects, the nonlinear optical crystal may be arranged in an air atmosphere.

Furthermore, as an eighth aspect applicable to at least any one of the first to seventh aspects, a beam diameter of the laser light made incident to the entrance end face of the nonlinear optical crystal is preferably not less than 0.5 mm.

Advantageous Effect of Invention

The laser light source according to the present invention effectively suppresses the variation or variation expansion of the propagation state of the randomly-polarized laser light.

BRIEF DESCRIPTION OF DRAWINGS

FIGS. 9A to 9C are drawings (Part 2) showing examples as to beam expansion magnifications.

FIG. 12 is a drawing showing a measurement optical system for beam profile.

FIG. 13 is a drawing showing a measurement optical system for beam profile (with the DKDP crystal being arranged).

DESCRIPTION OF EMBODIMENTS

An embodiment of the present invention will be described below in detail with reference to the accompanying drawings. In the description of the drawings the same elements will be denoted by the same reference signs, without redundant description. In the description hereinbelow, the conventional configuration will be first described to clarify the problem in the configuration and thereafter the embodiment of the present invention will be described.

Figure 1A:
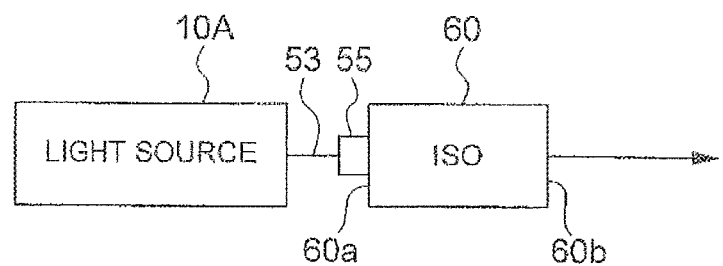
FIGS. 1A and 1B are drawings showing the arrangement and configuration of the ISO used in a general laser light source.
Figure 1B:
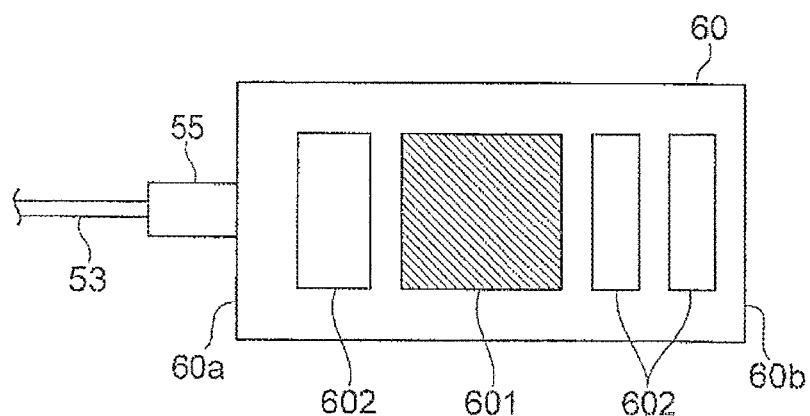

FIGS. 1A and 1B are drawings showing the arrangement and configuration of the ISO (Isolator) used in a general laser light source. As shown in FIG. 1A, the ISO (Isolator) 60 is disposed at a subsequent stage to a light source unit 10A. The light source unit 10A is a part that has the major function of the laser light source and includes a seed light source for emitting pulsed light (laser light), a fiber laser as amplification means for amplifying the seed light, and a waveform control means for controlling the waveform of the pulsed light. A delivery fiber 53 connects the light source unit 10A and the ISO 60 and a collimator lens 55 is also disposed at a preceding stage in front of the ISO 60.

In general, a laser processing device includes a laser light source with a large output or high peak power, an external optical system including a condensing optical system, a laser control system, software, and so on. Optical feedback appears noticeable depending upon workpieces to be subjected to laser processing. For this reason, the ISO 60 is made using the TGG ($Tb_3Ga_5O_{12}$) crystal or the TSAG ($Tb_3(ScAl)_5O_{12}$) crystal, or the like, in order to protect the laser light source from the optical feedback so as not to break. The ISO 60, as shown in FIG. 1B, has an entrance end face 60a for the laser light to enter and an exit end face 60b for the laser light to exit, and has a Faraday rotation crystal 601 such as the foregoing TGG crystal or TSAG crystal, and birefringent crystals 602, which are arranged between the entrance end face 60a and the exit end face 60b.

Figure 2:
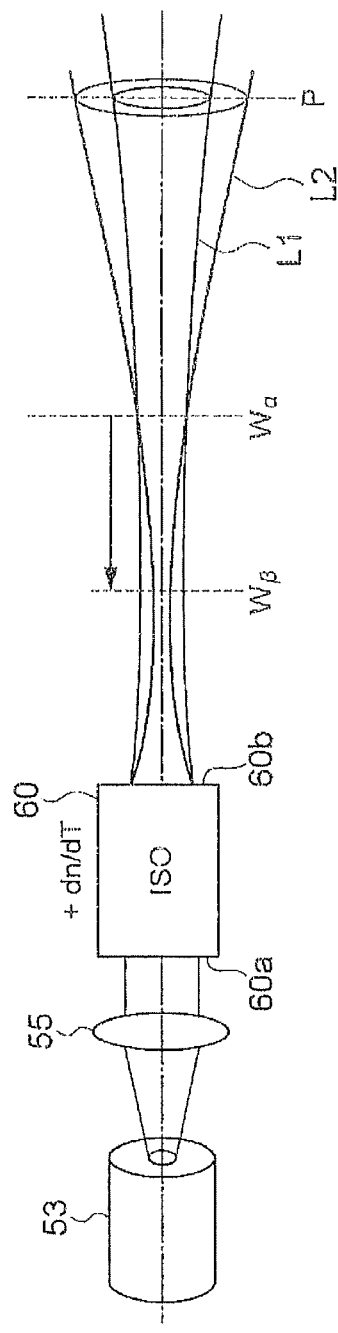
FIG. 2 is a drawing for explaining beam propagation by the thermal lens effect of the ISO.

With increase in the output power or peak value of the laser light from the light source unit 10A, influence of the thermal lens effect in the ISO appears more prominent, so as to vary a propagation state of the laser light (the beam diameter, the cross-sectional shape of the beam, and so on). This will be described with FIG. 2. The thermooptic constants $dn_1/dT$ of the TGG crystal and TSAG crystal used as ISO 60 have the positive sign. For this reason, the propagation state of the laser light is varied by the thermal lens effect of these Faraday rotation crystals, as in a convex GRIN lens (GRIN). As a result, the beam propagation varies from L1 to L2 because of the presence of ISO 60 and the beam waist position behind the ISO 60 shifts from Wα to Wβ in FIG. 2. When the beams are compared at a measurement point P, as shown in FIG. 2, the beam diameter increases because of the presence of the ISO 60. When these laser beams in the different propagation states (L1 and L2) are condensed by a lens, the difference of incoming wavefront causes variation in position of focus or the like, raising a significant problem in precise laser processing.

Figure 3A:
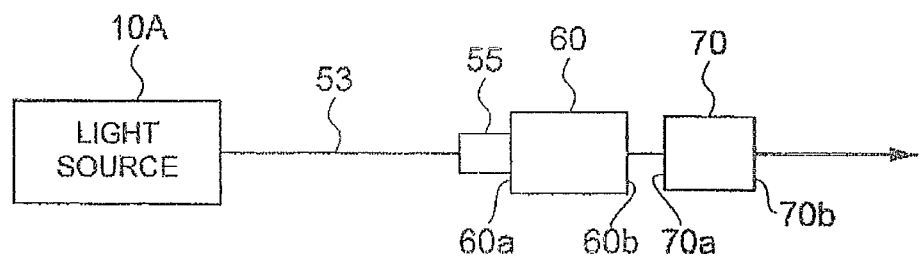
FIGS. 3A and 3B are drawings showing examples of arrangement of the DKDP crystal.
Figure 3B:
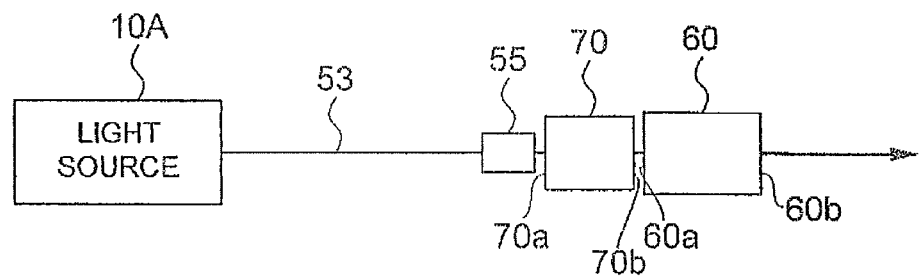

One of methods for compensating for the thermal lens effect due to the positive thermooptic constant $dn_1/dT$ is a method of disposing a nonlinear optical crystal with a negative thermooptic constant $dn_2/dT$ on the optical path of the laser light. Namely, by the arrangement of the nonlinear optical crystals in different signs, the thermooptic constant becomes $dn_1/dT - dn_2/dT$, cancelling out the thermal lens effect. In fact there are no crystals in opposite signs with the same absolute value of thermooptic constants, but the compensation can be made to some extent by adjusting the crystal lengths or the like. For example, since the DKDP crystal is the nonlinear optical crystal with the physical property of $-dn_2/dT$, it is effective to locate it at a preceding stage or at a subsequent stage to the ISO 60 using the TGG crystal or the TSAG crystal, behind the delivery fiber 53, as shown in FIGS. 3A and 3B. FIG. 3A shows an example wherein the DKDP crystal 70 is located behind the ISO 60, and FIG. 3B shows an example wherein the DKDP crystal 70 is located between the collimator lens 55 and the ISO 60. The DKDP crystal 70 has an entrance end face 70a for the laser light to enter and an exit end face 70b for the laser light to exit.

However, the above-described method of compensating for the beam expansion is dependent on polarization of the laser light source and thus is not suitable for the randomly-polarized laser light source. Even if the percentage of optical feedback to output light can be controlled to 0.1% or less by use of the DKDP crystal provided with an AR coat (antireflection film), influence thereof will be significant if the output power (light intensity) or peak value of the laser light from the laser light source is high. There was a possibility of breakage of the light source element, particularly, when the DKDP crystal 70 was arranged so that the entrance end face 70a thereof was perpendicular to the before-incidence propagation axis of the before-incidence light.

The below embodiment will describe a configuration wherein the DKDP crystal 70 is arranged in a state in which the entrance face 70a is inclined with respect to the before-incidence propagation axis of the laser light, as a method for avoiding the influence of optical feedback into the laser light source while suppressing the beam expansion in the laser light source to emit the randomly-polarized laser light as well.

Figure 4:
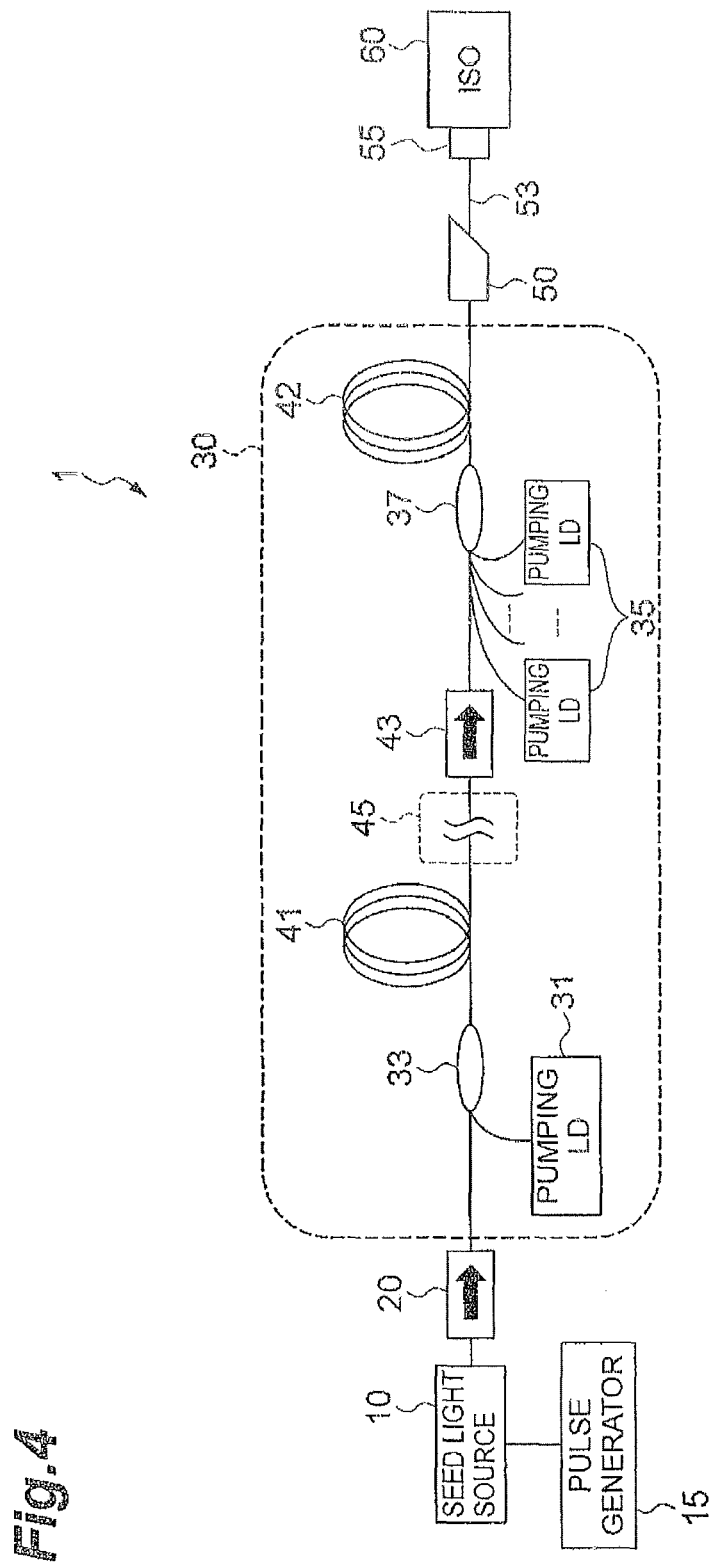
FIG. 4 is a drawing for explaining a configuration of a laser light source in the MOPA structure.

FIG. 4 shows a configuration example of the laser light source 1 in the MOPA (Master oscillator power amplifier) structure. As shown in FIG. 4, the laser light source 1 has a seed light source 10, a pulse generator 15 (waveform control means), an isolator 20, an optical fiber amplification unit (fiber laser) 30, an output connector 50, a delivery fiber 53, a collimator lens 55, and the ISO 60. Pulsed light output from the seed light source 10 under control of the pulse generator 15 is amplified by the optical fiber amplification unit 30. For this reason, the recurrence frequency of the pulsed light is dependent on the performance of the pulse generator 15, and can be set in a wide range from several ten kHz to about 1 MHz. The pulse waveform is dependent on the performance of the pulse generator 15 and the seed light source 10 and a pulse waveform with multiple peaks can be generated, depending upon oscillation conditions of the pulsed light. In a region 45 in FIG. 4, it is also possible to apply a configuration wherein a YbDF amplifier is inserted or a configuration wherein a filter for letting only light of a specific wavelength pass is inserted, as occasion may demand.

The pulsed light emitted from the seed light source 10 travels through the isolator 20 and is amplified in the optical fiber amplification unit 30. In the laser light source 1 shown in FIG. 4, the optical fiber amplification unit 30 is composed of pumping LDs 31, 35, optical combiners 33, 37, YbDF (Yb-doped optical fibers) 41, 42, and an isolator 43. The light entering the optical fiber amplification unit 30 through the isolator 20 is amplified in the YbDF 41 as the pumping LD 31 supplies pumping light into the YbDF 41. Furthermore, the light amplified in the YbDF 41 travels through the isolator 43 and is further amplified in the YbDF 42 as pumping light is supplied from the plurality of pumping LDs 35 into the YbDF 42. In this manner, the pulsed light from the seed light source 10 is amplified in the optical fiber amplification unit 30 and then output. It is also possible, as described above, to locate the YbDF amplifier or the filter in the region 45 provided between the YbDF 41 and the isolator 43.

Figure 5:
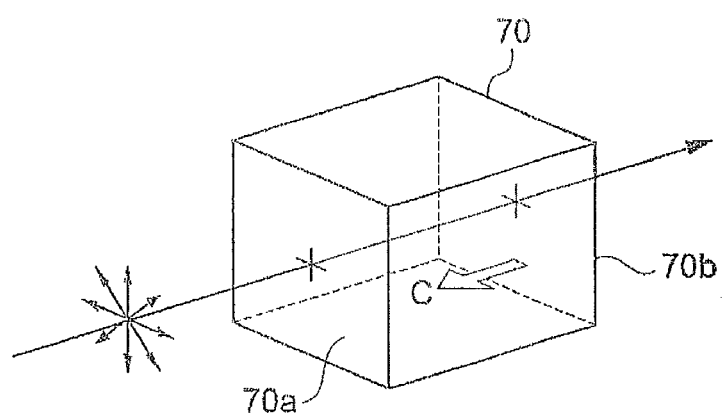
FIG. 5 is a drawing for explaining a relationship between the DKDP crystal and randomly-polarized light.

The following will describe the DKDP crystal 70 disposed at the subsequent stage to this laser light source 1. Specifically, the DKDP crystal 70 is arranged at the position shown in FIG. 3A. FIG. 5 shows the crystal orientation and arrangement of the DKDP crystal 70 in the case where the laser light emitted from the exit end face 60b of ISO 60 is incident normally to the DKDP crystal 70. The DKDP crystal 70 is classified in the tetragonal system and has uniaxial optical anisotropy. For this reason, when the laser light incident into the DKDP crystal 70 is randomly-polarized light, the laser light needs to be made incident along the optic axis of the DKDP crystal 70 so as to make the refractive index equal for every polarization. FIG. 5 shows the relationship between the randomly-polarized laser light and the optic axis of the DKDP crystal 70, in which both of the before-incidence propagation axis and the in-crystal propagation axis of the laser light are coincident with the optic axis of the DKDP crystal 70. Since the DKDP crystal 70 is the uniaxial tetragonal system, it has one optic axis and the optic axis is coincident with the c-axis (crystal axis).

Figure 6A:
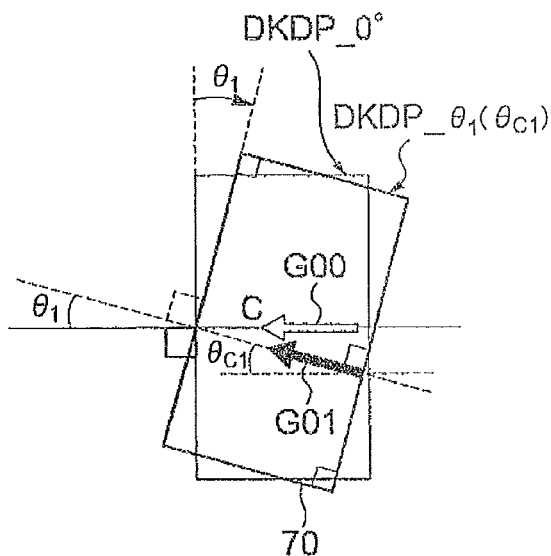
FIGS. 6A to 6C are drawings for explaining arrangement of the DKDP crystal.
Figure 6B:
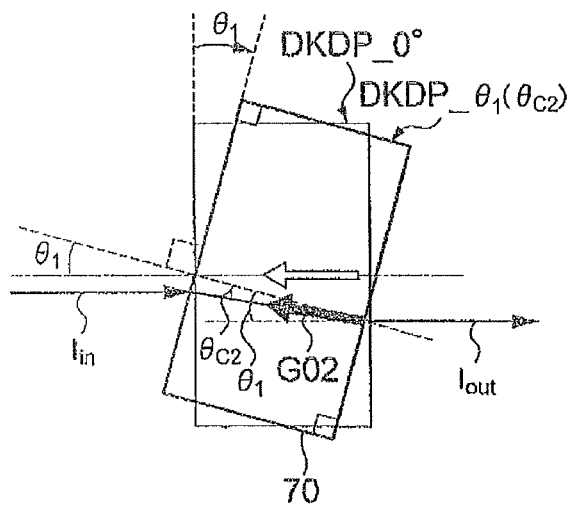
Figure 6C:
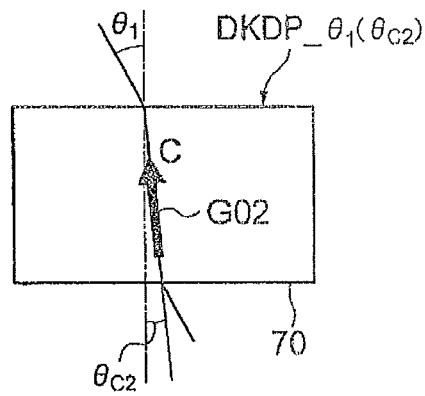

It is considered that even if the DKDP crystal 70 is provided with the AR coat, the influence of the optical feedback from the entrance end face 70a of the DKDP crystal cannot be eliminated if the entrance end face 70a of the DKDP crystal 70 is normal to the before-incidence propagation axis of the laser light as long as the large-output laser light or the high-peak laser light is used. Then, let us study a method for eliminating the influence of the optical feedback on the light source element by arranging the DKDP crystal 70 in a state in which the entrance end face 70a is inclined with respect to the before-incidence propagation axis of the laser light, as shown in FIGS. 6A to 6C. In FIGS. 6A to 6C, it is assumed that DKDP_0° is a cube and the optic axis of DKDP_0° (c-axis: G00) is parallel to the before-incidence propagation axis of the laser light. Next, as shown in FIG. 6A, let DKDP_$\theta_1(\theta_{c1})$ be a case where the DKDP crystal 70 is inclined at an angle $\theta_1$ to the before-incidence propagation axis of the laser light. In this case, since the DKDP crystal 70 is inclined by $\theta_1$ with respect to the before-incidence propagation axis of the laser light, the angle ($\theta_{c1}$) of the c-axis G01 of the DKDP crystal 70 is also $\theta_1$ slant with respect to the before-incidence propagation axis of the laser light.

Next, we will explain a case where the laser light of the wavelength $\lambda_1$ is incident into the DKDP_$\theta_1(\theta_{c1})$, using FIG. 6B. The incoming laser light $I_{in}$ is made incident into the DKDP_$\theta_1(\theta_{c1})$ crystal 70 inclined at $\theta_1$ to the before-incidence propagation axis of the incoming laser light (i.e., the angle of incidence of the laser light $I_{in}$ is $\theta_1$). In this case, according to the Snell's law, the incoming laser light $I_{in}$ is refracted at a refraction angle $\theta_2$ in Formula (1) to a normal to the entrance end face 70a of the DKDP_$\theta_1(\theta_{c1})$ crystal 70.

$$\theta_2 = \sin^{-1}\left(\frac{n_1(\lambda_1)}{n_2(\lambda_1)} \cdot \sin\theta_1\right) \quad \text{[Math 1]}$$

There arises an offset dependent on the thickness of the DKDP crystal 70 (the thickness along the in-crystal propagation axis of the laser light) between the outgoing laser light $I_{out}$ emitted from the DKDP crystal 70 and the incoming laser light $I_{in}$ (which is a deviation between the before-incidence propagation axis and the after-emergence propagation axis), while the outgoing laser light $I_{out}$ is output in parallel with the incoming laser light $I_{in}$. An important point herein is that the c-axis of the DKDP crystal 70 needs to be coincident or parallel with the in-crystal propagation axis along which the refracted laser light propagates in the DKDP_$\theta_1(\theta_2)$ crystal 70. Namely, as shown in FIG. 6B, the optic axis of the DKDP_$\theta_1(\theta_2)$ crystal 70 needs to be coincident or parallel with the in-crystal propagation axis of the randomly-polarized laser light. FIG. 6C is an extract of part of the information described in FIG. 6B. When the laser light is incident at the angle $\theta_1$ into the DKDP_$\theta_1(\theta_2)$ crystal 70, the refraction angle $\theta_2$ is derived by Formula (1). Here, the angle ($\theta_{c2}$) of the c-axis (G02) of the DKDP crystal 70 with respect to the normal to the entrance end face 70a is adjusted to the same direction as the refraction angle $\theta_2$.

Figure 7A:
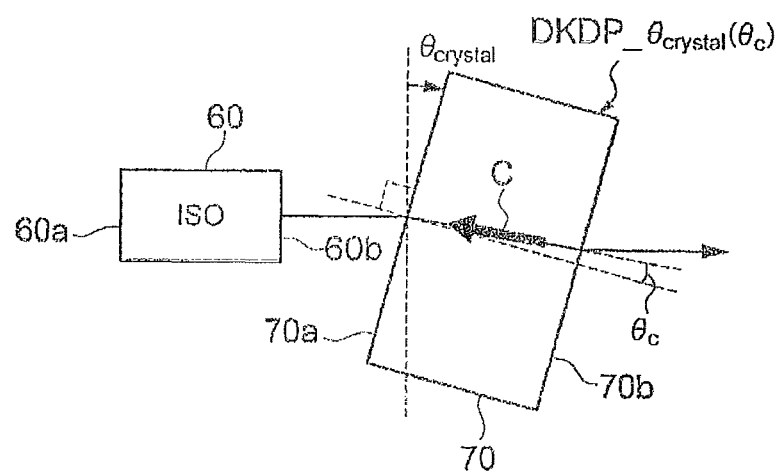
FIGS. 7A and 7B are drawings for explaining relationships of arrangement of the DKDP crystal and ISO.
Figure 7B:
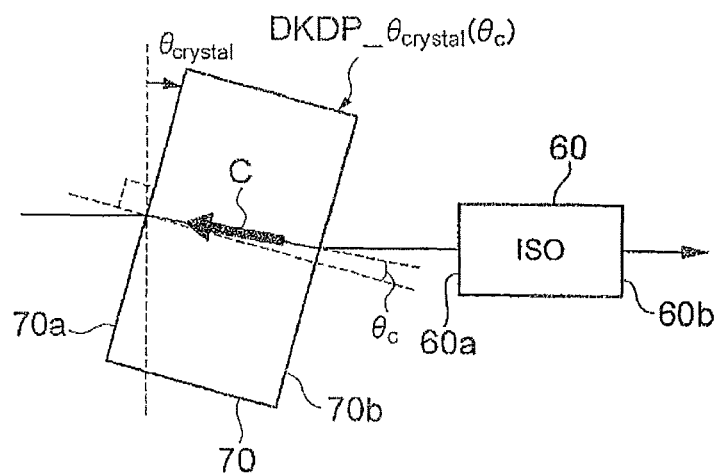

FIG. 7A shows a schematic view in the case where the laser light emitted from the ISO 60 is incident into the DKDP crystal 70. For preventing the Fresnel reflection from the entrance end face 70a and the exit end face 70b of the DKDP crystal 70, the DKDP crystal 70 is set so that an inclination angle thereof to the before-incidence propagation axis of the laser light is $\theta_{crystal}$ (DKDP_$\theta_{crystal}(\theta_c)$). In this case, when the DKDP crystal 70 is arranged so that the angle ($\theta_c$) of the c-axis to the normal to the entrance end face 70a is the same angle as the refraction angle $\theta_2$ obtained from Formula (1), the DKDP crystal 70 can be a polarization-independent beam expansion compensation element. This also applies similarly to the case where the DKDP crystal 70 is located at the preceding stage in front of the ISO 60, as shown in FIG. 7B.

From the geometric optics viewpoint as described above, when the randomly-polarized laser light passes through the DKDP crystal 70 arranged as described below, the production of polarization dependence can be suppressed for the laser light and generation of optical feedback can also be suppressed. The DKDP crystal 70 is arranged so that the inclination angle $\theta_{crystal}$ of the entrance end face 70a to a surface perpendicular to the before-incidence propagation axis of the laser light (i.e., the angle of incidence between the normal to the entrance end face 70a and the before-incidence propagation axis of the laser light) satisfies the condition of $0°<\theta_{crystal}<90°$ and so that the in-crystal propagation axis of the laser light propagating in the DKDP crystal 70 is parallel to the optic axis (c-axis) of the DKDP crystal 70.

However, the optical feedback power becomes large around the inclination angle $\theta_{crystal}$ (angle of incidence) of 0° compared to the transmitted light power. Furthermore, in the case of random polarization, it is necessary to make the optical feedback power equal for randomly-polarized light (or make the transmitted light power equal for both s-wave and p-wave) and to avoid vertical reflection. For this reason, a practical range of the inclination angle $\theta_{crystal}$ is preferably not less than 1° and not more than 10°.

Now, let us show examples of the above embodiment using the MOPA type laser light source 1 shown in FIG. 4. In this regard, the average output power of the laser light is approximately 20 W and the recurrence frequency is variable from several ten kHz to 1 MHz. The laser light source 1 is arranged in such a manner that the pulse waveform can be freely controlled by the pulse generator 15. The main emission wavelength is 1.06 μm and the output is randomly-polarized light. FIGS. 8A to 11B show pulsed oscillation characteristics in control of the pulse waveform under the settings of the recurrence frequency in the range of 100 kHz to 1 MHz and the peak value of about 80 kW.

Figure 8A:
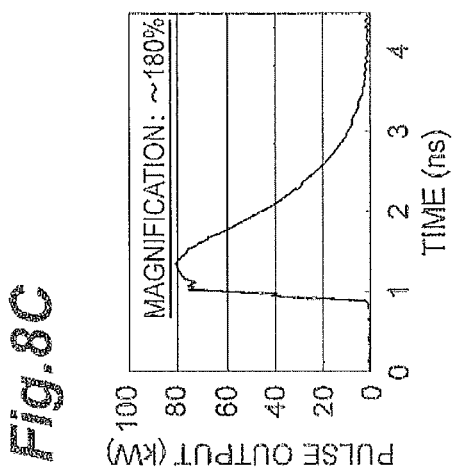
FIGS. 8A to 8C are drawings (Part 1) showing examples as to beam expansion magnifications.
Figure 8B:
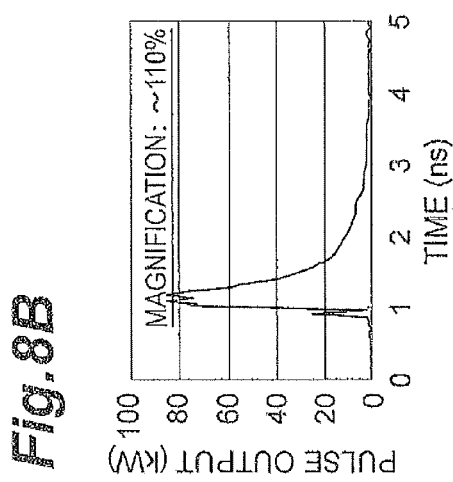
Figure 8C:
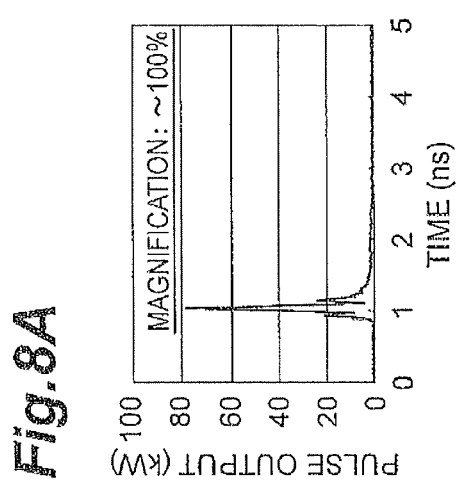
Figure 10B:
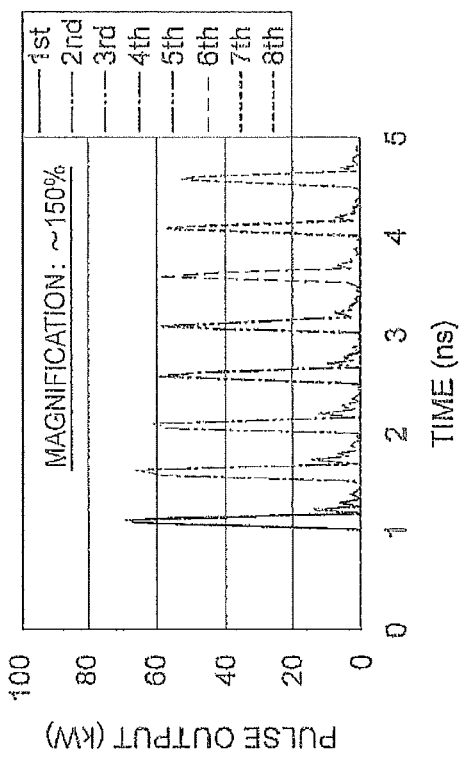
FIGS. 10A and 10B are drawings (Part 1) showing examples as to beam expansion magnifications.
Figure 10A:
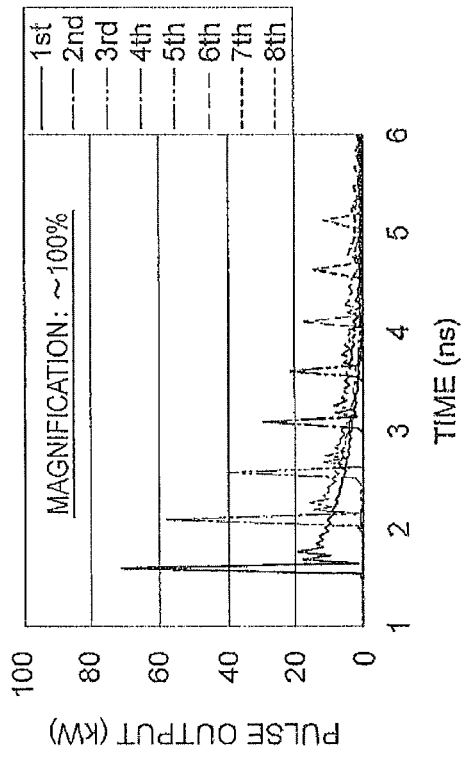
Figure 11B:
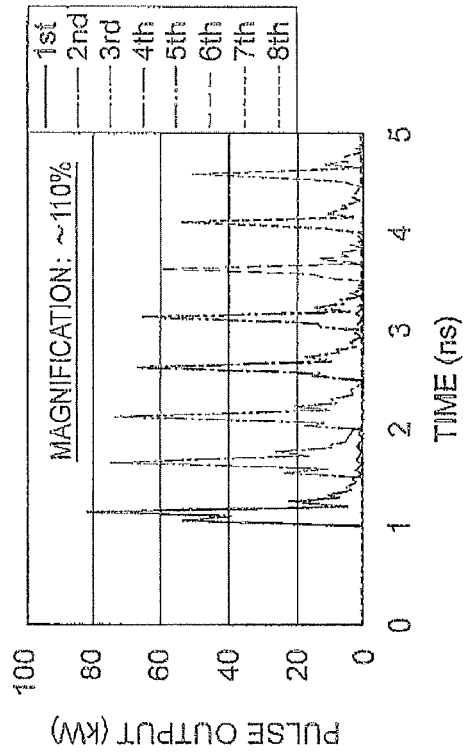
FIGS. 11A and 11B are drawings (Part 2) showing examples as to beam expansion magnifications.
Figure 11A:
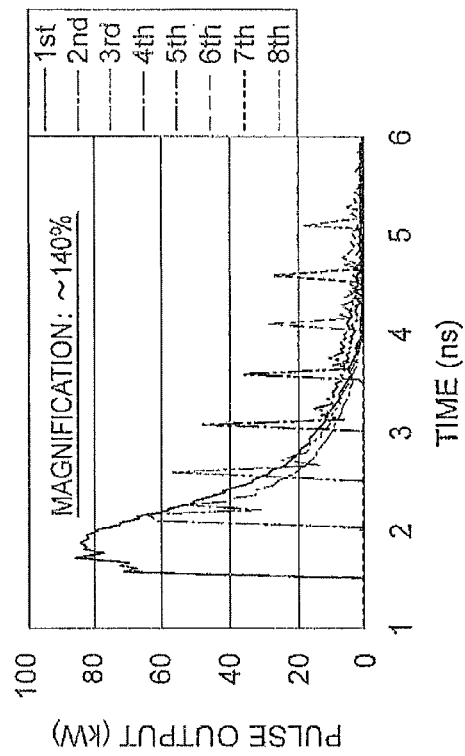

FIGS. 8A to 8C show the results in control of the pulse width against various pulse energies, under the conditions that the recurrence frequency is constant at 200 kHz and that the peak value of the pulsed light (laser light) is constant at about 80 kW. FIG. 8A shows the result with the pulse energy of 10 μJ; FIG. 8B the result with the pulse energy of 50 μJ; FIG. 8C the result with the pulse energy of 100 μJ. FIGS. 9A to 9C show the results in control of the pulse width so as to make the average output power constant at about 20 W against various recurrence frequencies, under the condition that the peak value of the pulsed light is constant at about 80 kW. FIG. 9A shows the result with the recurrence frequency of 500 kHz; FIG. 9B the result with the recurrence frequency of 300 kHz; FIG. 9C the result with the recurrence frequency of 200 kHz. FIGS. 10A and 10B are examples of generation of multiple pulses at the recurrence frequency of 300 kHz with control to different pulse widths. The overall pulse energy in FIG. 10A is 61 μJ and the overall pulse energy in FIG. 10B is 59 μJ. FIGS. 11A and 11B are examples of generation of multiple pulses at the recurrence frequency of 100 kHz with control to different pulse widths. The overall pulse energy in FIG. 11A is 174 μJ and the overall pulse energy in FIG. 11B is 50 μJ. It should be noted that in the generation of multiple pulses the pulses generated are eight pulses and the pulse interval is 10 ns in all of the examples, but that the pulse interval is shown as 0.5 ns in each of FIGS. 10A and 10B and FIGS. 11A and 11B. In this manner, since the MOPA type laser light source 1 allows the pulse generator 15 to be independently controlled, it can generate various pulse waveforms. The magnification in the drawings refers to a magnification of the beam diameter expanded by the thermal lens effect, when measured at 1.5 m ahead, and is a percentage of the beam diameter of the laser beam with the peak value of 80 kW (the average output power of not less than 16 W) to the beam diameter of a Low-power beam free of the thermal lens effect with the average output power of not more than several hundred mW. Optical measurement systems shown in FIGS. 12 and 13 were used for this measurement of the beam diameter.

The optical measurement system 100 in FIG. 12 includes the light source unit 10A, an attenuation optical system 80, and a beam profiler 90. The light source unit 10A includes the seed light source 10, pulse generator 15, isolator 20, optical fiber amplification unit (fiber laser) 30, and output connector 50. The laser light emitted from the output connector 50 passes through the delivery fiber 53 and then enters the collimator lens 55. The laser light from the collimator lens 55 then exits from the exit end face 60b of the ISO 60. In the optical measurement system 101 in FIG. 13, the DKDP_$\theta_{crystal}(\theta_c)$ crystal 70 is arranged at the subsequent stage to the ISO 60, in addition to the optical measurement system in FIG. 12. In either of the measurement optical systems 100, 101, the laser light emitted from the ISO 60 (or from the DKDP_$\theta_{crystal}(\theta_c)$ crystal 70) is attenuated to a predetermined light intensity, for example, by the attenuation optical system 80 making use of the Fresnel reflection. Then the laser light attenuated to the predetermined light intensity is incident to the beam profiler 90. Therefore, the beam profiler 90 measures the beam diameter at a point 1.5 m away from the exit end face 60b of the ISO 60.

Figure 14A:
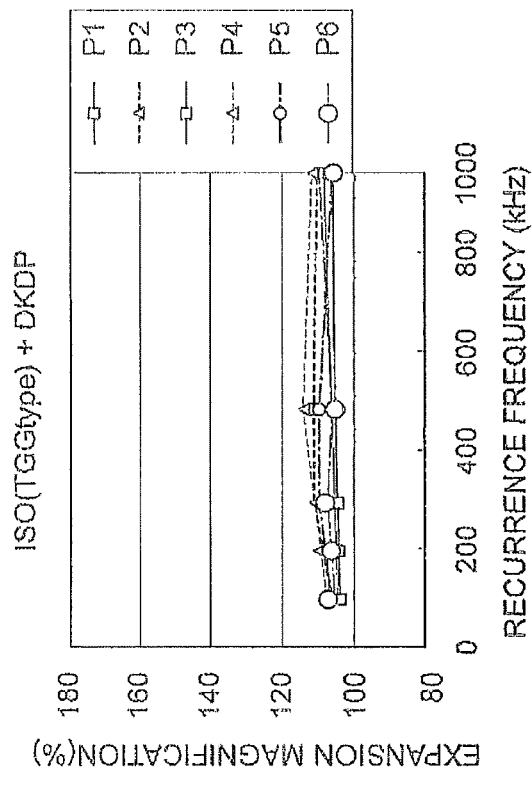
FIGS. 14A and 14B are drawings showing relationships between pulsed oscillation conditions and beam expansion magnifications.

FIG. 14A shows the beam diameter measurement results at the point 1.5 m from the TGG-type ISO using the TGG crystal. This measurement was done using the optical measurement system 100 in FIG. 12 (i.e., without use of the DKDP crystal). The expansion magnification of the beam diameter on the vertical axis in FIG. 14A is the percentage of the beam diameter with the 80-kW peak value in each oscillation condition to the beam diameter with about several hundred mW, or the Low power. Six types (P1 to P6) of typical pulsed oscillation conditions were prepared and the beam expansion percentages were investigated in the recurrence frequency range from 100 kHz to 1 MHz. As a result, three major types of beam expansion conditions were observed; i.e., a case of increase in expansion percentage on the low frequency side, a case of appearance of a peak from 200 to 300 kHz, and a case of increase in expansion percentage with increase of frequency. It is understood from the results of FIG. 14A that the thermal lens effect varies depending upon pulse waveforms. In this case, the maximum expansion percentage was 160%. Under other conditions, there was a case of over 200%. Namely, it was confirmed that variation of beam diameter occurred with the use of the TGG-type ISO.

Figure 14B:
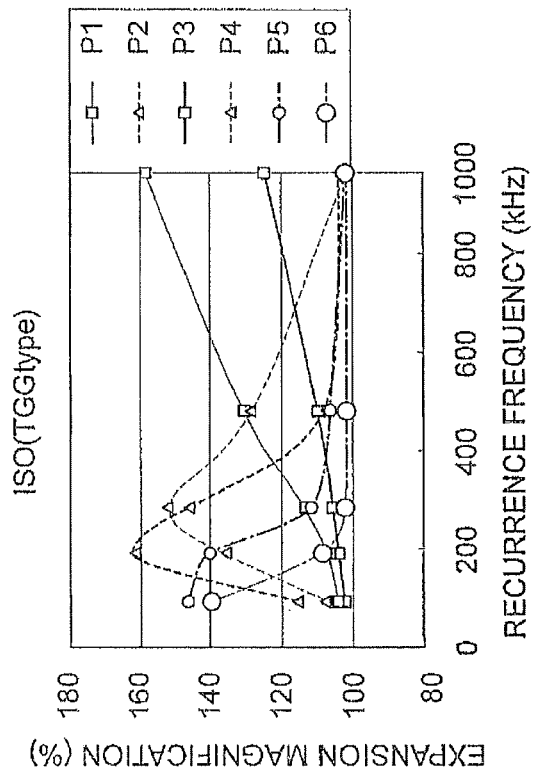

The following will describe verification experiments to compensate for the variation of beam propagation due to the thermal lens effect caused by the TGG-type ISO, by use of the DKDP crystal. The crystal arrangement of the beam expansion compensation element was the aforementioned DKDP_$\theta_{crystal}(\theta_c)$, the optical measurement system used was the one 101 shown in FIG. 13, and the other conditions were the same as in FIG. 14A. FIG. 14B shows the measurement results. It was confirmed that the expansion percentage of the beam diameter could be controlled to 110% or less by arranging the DKDP_$\theta_{crystal}(\theta_c)$ crystal 70 on the optical path. It is contemplated that the beam expansion can be further suppressed by optimizing the thickness of the DKDP crystal.

The beam diameter of the laser light incident to the entrance end face 70a of the DKDP crystal 70 is preferably not less than 0.5 mm. Furthermore, the thickness of the DKDP crystal 70 along the in-crystal propagation axis of the laser light is preferably not less than 5 mm and not more than 30 mm. Moreover, the length of one side of a cross section of the DKDP crystal 70, perpendicular to the in-crystal propagation axis of the laser light, is preferably not less than 0.7 mm and not more than 20 mm.

Figure 15:
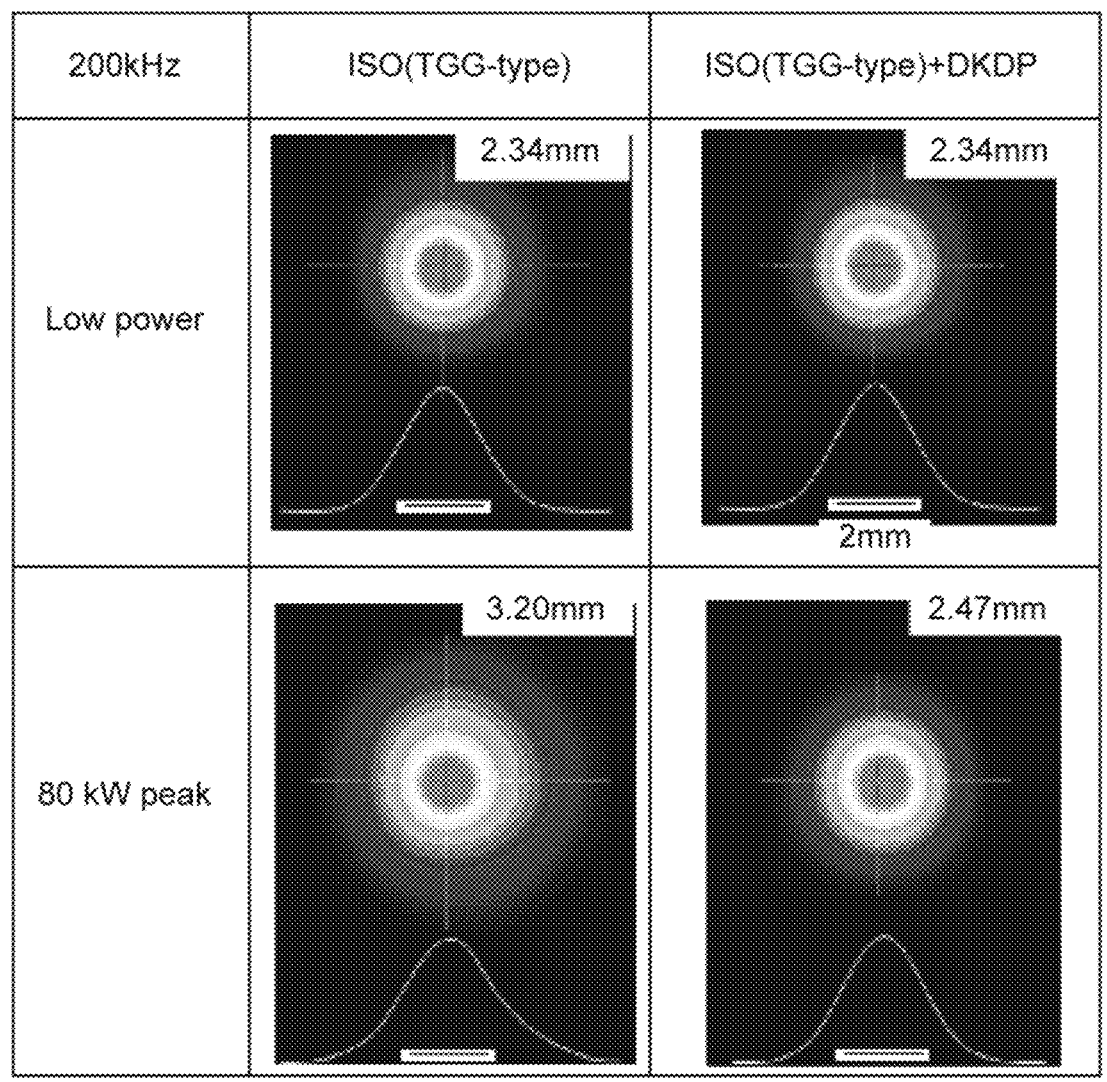
FIG. 15 is a drawing showing differences of beam profiles corresponding to the presence and absence of arrangement of the DKDP crystal.

FIG. 15 shows the measurement results of beam profiles with and without arrangement of the DKDP_$\theta_{crystal}(\theta_c)$ crystal (DKDP crystal 70) as the beam expansion compensation element at the subsequent stage to the TGG-type ISO (ISO 60). The beam profiles on the left side of FIG. 15 are those in the configuration with the TGG-type ISO only (without arrangement of the DKDP crystal) (which are the beam profiles in the cases of the Low-power pulsed light and the peak value of 80 kW, at the recurrence frequency of 200 kHz), and the beam profiles on the right side are those in the configuration wherein the DKDP_$\theta_{crystal}(\theta_c)$ crystal is arranged right behind the TGG-type ISO (which are the beam profiles in the cases of the Low-power pulsed light and the peak value of 80 kW, at the recurrence frequency of 200 kHz). As seen from FIG. 15, it was confirmed that the beam expansion was suppressed by arranging the DKDP_$\theta_{crystal}(\theta_c)$ crystal and that the same circularity as in the Low power case was achieved. It was confirmed by this result that the suppression could be achieved while maintaining the high beam quality, by use of the DKDP_$\theta_{crystal}(\theta_c)$ crystal.

Figure 16:
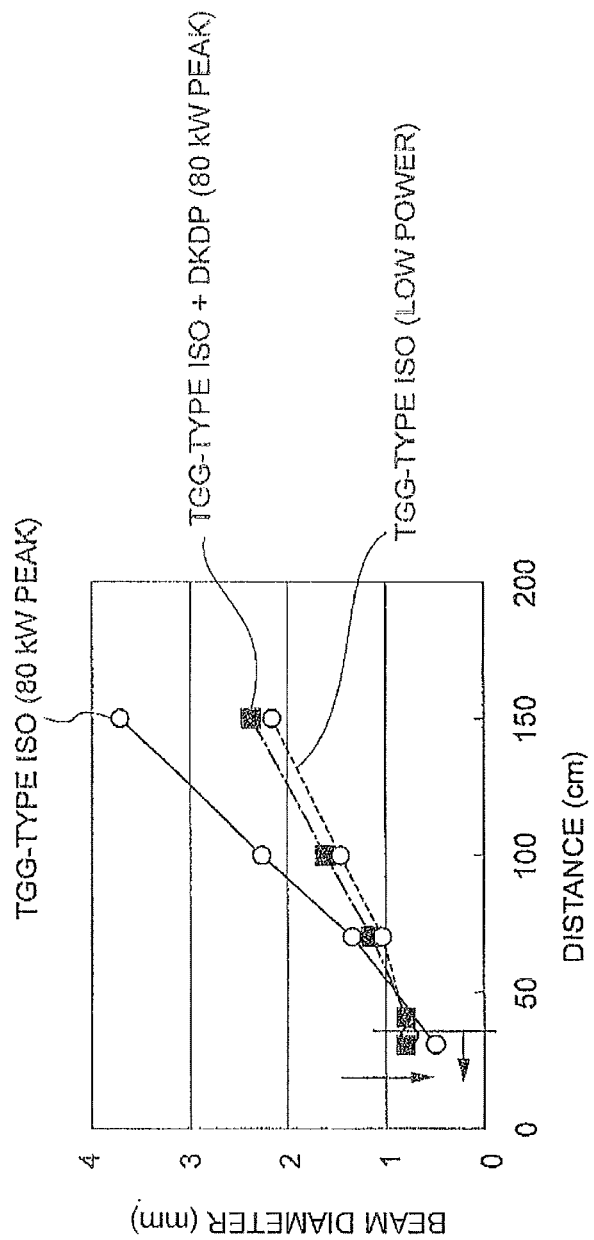
FIG. 16 is a drawing for explaining beam propagation corresponding to the presence and absence of arrangement of the DKDP crystal.

Furthermore, the results of investigation of beam propagation characteristics with the DKDP crystal being inserted are shown in FIG. 16. Concerning the TGG-type ISO (the pulse peak value of 80 kW), the beam waist position shifted toward the TGG-type ISO side (as indicated by an arrow directed leftward in FIG. 16) and the waist contracted (as indicated by an arrow directed downward in FIG. 16) when compared with the TGG-type ISO (Low power). As a result, the beam propagation varied and the beam diameter was found to be significantly expanded, at the position where the distance from the TGG-type ISO was 1.5 m. It was found on the other hand that when the DKDP crystal was arranged in addition to the TGG-type ISO (the pulse peak value of 80 kW), the DKDP crystal functioned well as a compensation element and the beam propagation was approximately equivalent to that in the case of the TGG-type ISO (Low power).

As described above, it was confirmed that the thermal lens effect appeared strong or weak depending upon combinations of various pulse waveforms with ISO and there were various cases about the conditions of occurrence of beam expansion and about beam expansion percentages. In contrast to it, it was confirmed that the suppression of beam expansion was achieved in all of those beam expansion conditions by use of the DKDP_$\theta_{crystal}(\theta_c)$ crystal. It became clear from the above that the DKDP_$\theta_{crystal}(\theta_c)$ crystal functioned as the beam expansion compensation element independent of randomly-polarized light.

Figure 17A:
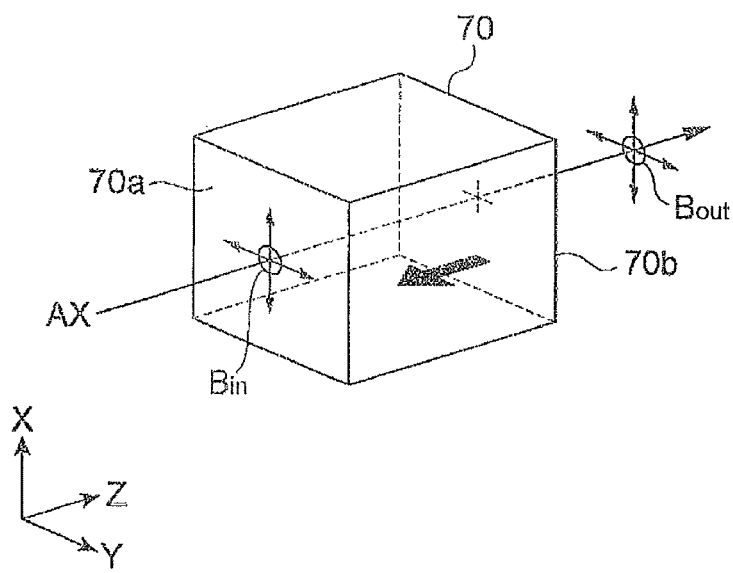
FIGS. 17A and 17B are drawings for explaining relationships between cross-sectional shapes of the DKDP crystal and suppression of expansion of beam diameter.
Figure 17B:
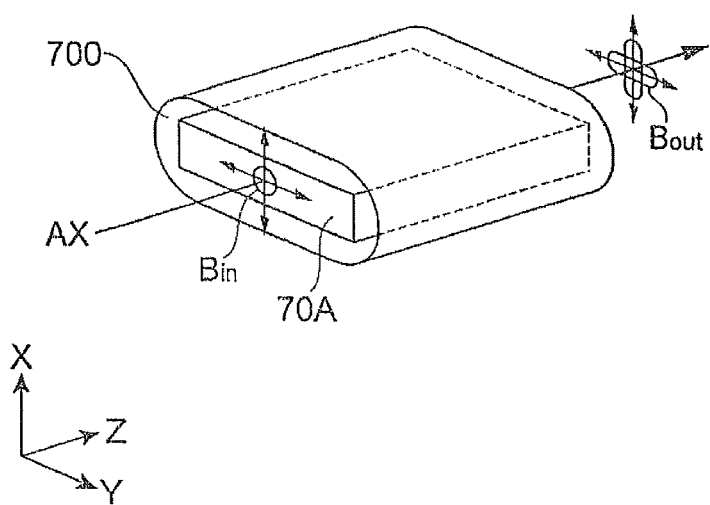

Next, FIGS. 17A and 17B show drawings for explaining relationships between cross-sectional shapes of the DKDP crystal and suppression of expansion of the beam diameter.

Since the DKDP crystal is the tetragonal system, coefficients of thermal conductivity in all directions have the same value in the cross section perpendicular to the optic axis of the DKDP crystal (coincident with the crystal c-axis). Namely, when the cross section of the DKDP crystal is assumed to be the x-y plane, the coefficient of thermal conductivity in the x-axis direction, $\sigma_x$, is equivalent to the coefficient of thermal conductivity in the y-axis direction, $\sigma_y$. Therefore, in the case of the DKDP crystal 70 with the square cross section as shown in FIG. 17A, heat dissipation capabilities in the x-axis direction and in the y-axis direction are equal. In this case, compensation performances for beam expansion in the x-axis direction and in the y-axis direction are equal in the DKDP crystal 70. For example, in the case where the laser light is made incident along the propagation axis AX into the DKDP crystal 70, if the beam shape $B_{in}$ on the entrance end face 70a of the DKDP crystal 70 is a true circle, the cross-sectional shape of the laser light emitted from the exit end face 70b (the beam shape $B_{out}$ on the exit end face 70b) is also maintained as a true circle. For this reason, the DKDP crystal 70 in FIG. 17A enables the compensation for the beam expansion while maintaining the true circle state of the beam cross-sectional shape. The beam diameter shown in FIG. 17A is shown as an example of relative size to crystal size. The beam diameter is defined as $e^{-1/2}$.

In the case of the DKDP crystal 70 shown in FIG. 17A, the thickness thereof in the x-axis direction is approximately equal to the beam diameter of the incoming laser light (provided that there is no power loss of the incoming laser light). In contrast to it, in the case of the DKDP crystal 70A shown in FIG. 17B, the thickness thereof in the y-axis direction is sufficiently larger than the beam diameter of the incoming laser light and all the faces except for the entrance end face and the exit end face of the DKDP crystal 70A, or, only the both faces parallel to the y-z plane are covered by a material 700 having the coefficient of thermal conductivity higher than the DKDP crystal 70A. In this case, as to the effective coefficients of thermal conductivity around the region of incidence of the laser light on the entrance end face, the relation of $\sigma_x > \sigma_y$ holds. The surrounding material 700 can be, for example, electroconductive Si rubber and the relationship between the effective coefficients of thermal conductivity around the incidence region of the laser light (the relationship between the coefficient of thermal conductivity in the x-axis direction and the coefficient of thermal conductivity in the y-axis direction of the DKDP crystal 70A covered by the Si rubber) is $\sigma^{DKDP+Si}_x > \sigma_y$. Under this condition, the heat dissipation capability in the x-axis direction is higher than that in the y-axis direction and thus a stationary heat distribution with laser irradiation in the DKDP crystal 70A assumes an aspect spreading in the x-axis direction. As a result, the beam expansion compensation performance in the x-axis direction of the DKDP crystal 70A becomes lower than that in the y-axis direction. However, even if the beam shape of the laser light incident along the propagation axis AX is a true circle on the entrance end face of the DKDP crystal 70A, the cross-sectional shape of the laser light emitted from the exit end face of the DKDP crystal 70A will be an elliptic shape elongated in the x-axis direction.

On the other hand, when the DKDP crystal 70A is surrounded by a material with the electric conductivity lower than that of the DKDP crystal 70A, or by gas, the relationship between the coefficient of thermal conductivity in the x-axis direction and the coefficient of thermal conductivity in the y-axis direction in the DKDP crystal 70A is $\sigma_x < \sigma_y$. For example, when the DKDP crystal 70A is surrounded by the air atmosphere (the coefficient of thermal conductivity of the air atmosphere is two orders of magnitude less than that of the DKDP crystal 70A), the relationship of the effective coefficients of thermal conductivity around the incidence region of the laser light (i.e., the relationship between the coefficient of thermal conductivity in the x-axis direction and the coefficient of thermal conductivity in the y-axis direction of the DKDP crystal 70A in the air atmosphere) is $\sigma^{DKDP+Air}_x < \sigma_y$. Namely, the heat dissipation capability in the x-axis direction becomes lower than that in the y-axis direction. It results in improvement in the beam expansion compensation performance in the x-axis direction. However, even if the beam shape of the laser light incident along the propagation axis AX is a true circle on the entrance end face of the DKDP crystal 70A, the cross-sectional shape of the laser light emitted from the exit end face of the DKDP crystal 70A will be an elliptic shape elongated in the y-axis direction.

In this manner the ratio of the beam expansion compensation performances on the x-axis and on the y-axis can be controlled by the shape on the x-y plane (the cross section of the DKDP crystal) and by the surrounding material, as well as by the crystal thickness along the z-axis.

The cross-sectional shape of the DKDP crystal does not have to be limited to the square or the rectangle as described above. For example, the cross-sectional shape may be a shape in which a plurality of rectangular regions with different thicknesses along the x-axis (first reference axis) are arranged so as to be adjacent along the y-axis (second reference axis) (cf. FIG. 18B or FIG. 19A), or, may be a shape in which the thickness along the x-axis continuously varies along the y-axis (cf. FIG. 19B). When the cross-sectional shape of the DKDP crystal is an arbitrary shape and the position of incidence of the laser light into the DKDP crystal is allowed to change, the ratio of the beam expansion compensation performance in the x-axis direction and the beam expansion compensation performance in the y-axis direction can be freely adjusted. In this case, the length of one side of the cross section of the DKDP crystal is preferably not less than 0.7 mm and not more than 20 mm.

Figure 18A:
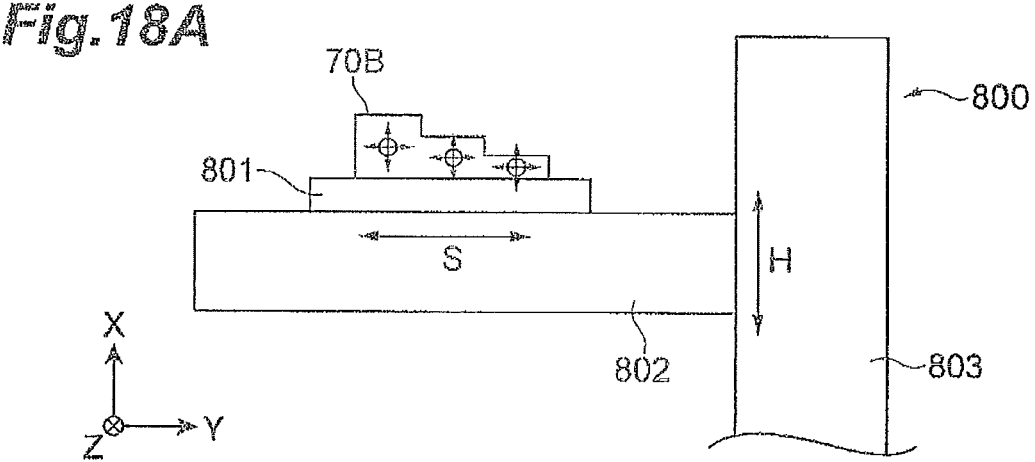
FIGS. 18A to 18C are drawings showing another example of the DKDP crystal.

FIG. 18A shows a positioning stage (position control mechanism) 800 for adjusting the position of incidence of the laser light into the DKDP crystal. This positioning stage 800 has at least a first stage 801 on which the DKDP crystal is to be mounted, a second stage 802 for holding the first stage in a movable stage, and a support pillar 803 for holding the second stage in a movable state. The first stage 801 is movable with the DKDP crystal 70B being mounted thereon, along the y-axis (horizontal direction S) relative to the second stage 802. The second stage 802 is movable with the first stage 801 being held thereby, along the x-axis (vertical direction H) relative to the support pillar 803. FIG. 18A shows the structure for moving the DKDP crystal 70B on the x-y plane, as a part of the positioning stage 800, and the positioning stage 800 also includes a mechanism for moving the support pillar 803 along the z-axis and further includes a mechanism for inclining the support pillar 803 with respect to the x-axis.

The below will describe control of anisotropy of the effective coefficients of thermal conductivity around the laser light incidence region on the x-y plane (the cross section of the DKDP crystal).

Figure 18B:
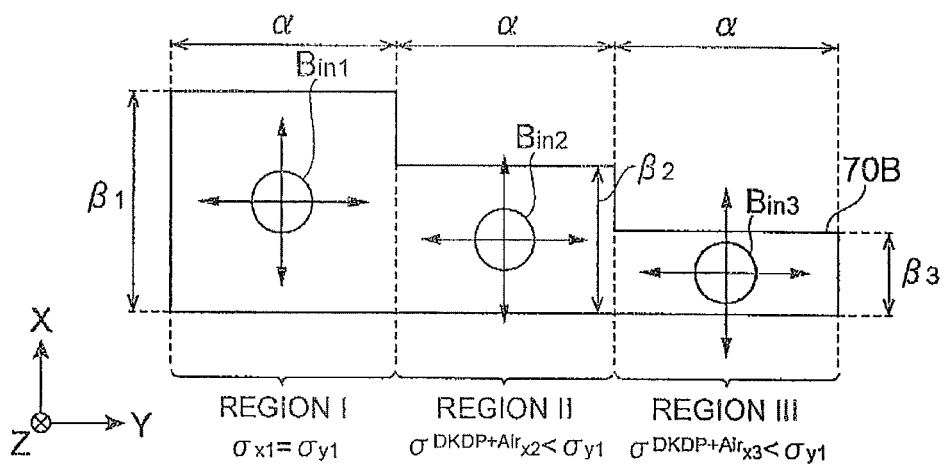
Figure 18C:
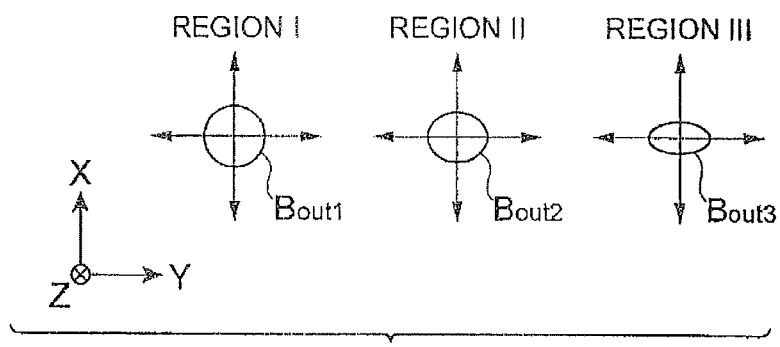

FIG. 18B is a drawing showing another example of the DKDP crystal and the cross section of the DKDP crystal 70B shown in FIG. 18B has a structure in which a plurality of rectangular regions I to III with different thicknesses in the x-axis direction are arranged along the y-axis direction. Specifically, the region I is a rectangular region with the thickness $\beta_1$ in the x-axis direction and the thickness $\alpha$ in the y-axis direction; the region II is a rectangular region with the thickness $\beta_2$ in the x-axis direction and the thickness $\alpha$ in the y-axis direction; the region III is a rectangular region with the thickness $\beta_3$ in the x-axis direction and the thickness $\alpha$ in the y-axis direction. The peripheral surface of the DKDP crystal 70B is covered by a material with a low coefficient of thermal conductivity or exposed to the air atmosphere. In FIG. 18B, incident beam shapes $B_{in1}$, $B_{in2}$, and $B_{in3}$ in the regions I to III are illustrated in relative dimensions to crystal plate sizes, as just one example. The coefficients of thermal conductivity $\sigma_{x1}$ and $\sigma_{y1}$ in the region I are equal ($\sigma_{x1} = \sigma_{y1}$) because $\alpha = \beta_1$. On the other hand, since the regions II and III are in the relation of $\alpha > \beta_2 > \beta_3$, the effective coefficients of thermal conductivity around the incident beam region in the region II and the region III are $\sigma^{DKDP+Air}_{x2} < \sigma_{y1}$ and $\sigma^{DKDP+Air}_{x3} < \sigma_{y1}$, and the relationship of $\sigma^{DKDP+Air}_{x3} < \sigma^{DKDP+Air}_{x2}$ holds. Namely, the beam expansion compensation performances in the x-axis direction and in the y-axis direction are equal in the region I, but the beam expansion compensation performance in the x-axis direction is improved by letting the beam enter the region II or the region III with the different ratio of the length in the x-axis direction and the length in the y-axis direction (or the different aspect ratio). Since the beam expansion compensation performance in the x-axis direction in the region III is higher than that in the region II, even if the incident beam diameter into the DKDP crystal is a true circle, the shape of the beam outgoing from the DKDP crystal will be an ellipse flattened in the x-axis direction as shown in FIG. 18C. The measurement position of the beam shapes in FIG. 18C is, for example, the exit end face 70b of the DKDP crystal 70B (immediately after emergence of the laser light).

Figure 19A:
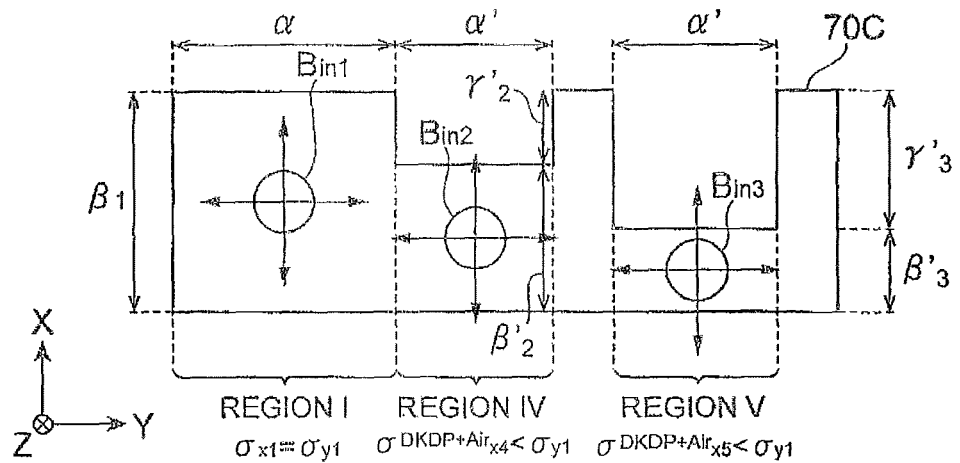
FIGS. 19A and 19B are drawings showing still other examples of the DKDP crystal.
Figure 19B:
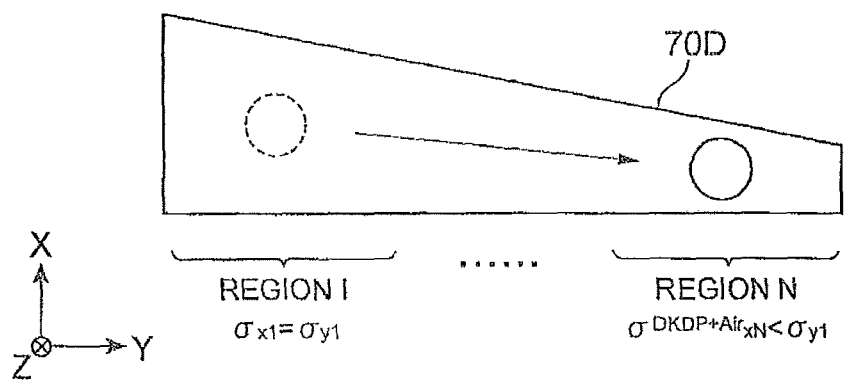

Furthermore, FIGS. 19A and 19B show still other examples of the cross-sectional shape in the DKDP crystal. The DKDP crystal 70C shown in FIG. 19A is obtained by preparing a DKDP crystal plate with the thickness $\beta_1$ in the x-axis direction and by etching it by dry etching or by cutting it with a dicing saw (to realize the predetermined shape shown in FIG. 19A). When the dicing saw is used, the shapes equivalent to the region II and the region III in FIG. 18B can be made by performing cutting while controlling the cutting depth like $\gamma'_2$, $\gamma'_3$ and shifting the saw by steps of about the blade width in the y-axis direction until the predetermined width $\alpha'$ is obtained. The control in the depth direction may be achieved by multi-step cutting according to needs. The use of the above technique allows us to obtain the region IV and region V equivalent to the region II and the region III in FIG. 18B. The region IV is a rectangular region with the thickness $\beta'_2$ in the x-axis direction and the thickness $\alpha'$ in the y-axis direction and the region V is a rectangular region with the thickness $\beta'_3$ in the x-axis direction and the thickness $\alpha'$ in the y-axis direction. The effective coefficients of thermal conductivity around the incident beam region in the region IV and the region V are $\sigma^{DKDP+Air}_{x4} < \sigma_{y1}$ and $\sigma^{DKDP+Air}_{x5} < \sigma_{y1}$, and the relationship of $\sigma^{DKDP+Air}_{x5} < \sigma^{DKDP+Air}_{x4}$ holds. The cross-sectional shape as shown in FIG. 19A can also be realized by bonding DKDP crystals of different crystal thicknesses, but handling would be harder in microscopic size. The problem of handling can be solved by adopting the aforementioned technique. The periphery of crystal except for the entrance face and the exit face may be exposed in the air atmosphere, excluding the portion held on the stage or the like, or may be covered by electroconductive Si rubber.

This technique allows us to obtain a plurality of types of shapes with different aspect ratios from one DKDP crystal plate, as the shape of the laser incidence region. Namely, by scanning and controlling the laser incidence position into the DKDP crystal in in-plane directions by the positioning stage 800 shown in FIG. 18A, it is feasible to easily change the ratio of the compensation performance in the x-axis direction and the compensation performance in the y-axis direction, for the beam expansion. Use of the above technique is very effective in cases where the beam shape becomes off a true circle because of influence of distortion of the beam shape (cross-sectional shape) peculiar to the laser light source, defects existing in the shape of the crystal forming the ISO or existing inside thereof, defects existing in the shape of the DKDP crystal or existing inside thereof, the method of holding the DKDP crystal, and so on. It is also possible to realize the same beam expansion compensation with anisotropy as in FIG. 19A, by the DKDP crystal 70D having a cross section of a wedge shape shown in FIG. 19B. The DKDP crystal 70D shown in FIG. 19B has a cross-sectional shape in which N regions in the relation of $\sigma^{DKDP+Air}_{xN} < \sigma_{y1}$ are arranged along the y-axis direction from the region I with $\sigma_{x1} = \sigma_{y1}$. The thicknesses of the respective regions in the x-axis direction continuously vary along the y-axis direction, while their thicknesses in the y-axis direction are set to y1.

The embodiment of the present invention was described above and it should be noted that the present invention is by no means intended to be limited to the above embodiment and can be modified in many ways.

REFERENCE SIGNS LIST 1 laser light source; 10 seed light source; 15 pulse generator; 20, 43 isolators; 30 optical fiber amplification unit (fiber laser); 50 output connector; 60 ISO; 70, and 70A-70D DKDP crystals; 80 attenuation optical system; 90 beam profiler; 100, 101 measurement optical systems.

The invention claimed is:

1. A laser light source comprising:
   a seed light source;
   a fiber laser for amplifying pulsed seed light emitted from the seed light source;
   a collimator lens for collimating laser light emitted from the fiber laser;
   an isolator having an entrance end face for the laser light collimated by the collimator lens to enter and an exit end face for the laser light to exit, the isolator comprising a Faraday rotation crystal having a positive thermooptic constant, which is arranged between the entrance end face and the exit end face; and
   a nonlinear optical crystal having a negative thermooptic constant, which is arranged on an optical path of the laser light propagating between the collimator lens and the isolator or on an optical path of the laser light emitted from the exit end face of the isolator, the nonlinear optical crystal having a first end face for the laser light to enter and a second end face for the laser light to exit, the second end face being opposed to the first end face,
   wherein the nonlinear optical crystal is arranged so that an angle between a first propagation axis of the laser light incident to the first end face of the nonlinear optical crystal and a normal to the first end face is larger than 0° and less than 90° and so that a second propagation axis of the laser light propagating in the nonlinear optical crystal is parallel to an optic axis of the nonlinear optical crystal.

2. The laser light source according to claim 1, wherein the angle between the first propagation axis of the laser light and the normal to the first end face is not less than 1° and not more than 10°.

3. The laser light source according to claim 1, wherein a thickness of the nonlinear optical crystal along the second propagation axis of the laser light is not less than 5 mm and not more than 30 mm.

4. The laser light source according to claim 1, further comprising: a position control mechanism for variably controlling a position of incidence of the laser light on the first end face of the nonlinear optical crystal,
   wherein a length of a side of a cross section of the nonlinear optical crystal, perpendicular to the second propagation axis of the laser light, is not less than 0.7 mm and not more than 20 mm, and
   wherein when axes perpendicular to each other on the cross section of the nonlinear optical crystal are defined as a first reference axis and a second reference axis, a shape of the cross section is a square, a rectangle, a shape in which a plurality of rectangular portions with different thicknesses along the first reference axis are arranged so as to be adjacent along the second reference axis, or a shape in which the thickness along the first reference axis continuously varies along the second reference axis.

5. The laser light source according to claim 4, wherein the shape in which the plurality of rectangular portions with different thicknesses along the first reference axis are arranged along the second reference axis includes a stepped shape or a comb shape.

6. The laser light source according to claim 1, wherein at least a part of a peripheral surface of the nonlinear optical crystal is covered by electroconductive silicone.

7. The laser light source according to claim 1, wherein the nonlinear optical crystal is arranged in an air atmosphere.

8. The laser light source according to claim 1, wherein a beam diameter of the laser light made incident to the first end face of the nonlinear optical crystal is not less than 0.5 mm.

* * * * *